United States Patent
Schydlo et al.

(10) Patent No.: US 12,466,364 B2
(45) Date of Patent: Nov. 11, 2025

(54) DEVICE AND METHOD FOR ENERGY RECOVERY FOR AN ELECTRICALLY DRIVEN MOTOR VEHICLE

(71) Applicant: MAN Truck & Bus SE, Munich (DE)

(72) Inventors: Alexander Schydlo, Munich (DE); Thomas Landsherr, Munich (DE)

(73) Assignee: MAN Truck & Bus SE, Munich (DE)

( * ) Notice: Subject to any disclaimer, the term of this patent is extended or adjusted under 35 U.S.C. 154(b) by 735 days.

(21) Appl. No.: 17/777,804

(22) PCT Filed: Nov. 9, 2020

(86) PCT No.: PCT/EP2020/081453
§ 371 (c)(1),
(2) Date: Nov. 15, 2022

(87) PCT Pub. No.: WO2021/099156
PCT Pub. Date: May 27, 2021

(65) Prior Publication Data
US 2023/0073678 A1 Mar. 9, 2023

(30) Foreign Application Priority Data
Nov. 18, 2019 (DE) ...................... 10 2019 007 992.2

(51) Int. Cl.
*B60T 1/10* (2006.01)
*B60L 50/61* (2019.01)
(Continued)

(52) U.S. Cl.
CPC ................ *B60T 1/10* (2013.01); *B60L 50/61* (2019.02); *B60T 1/087* (2013.01); *B60T 10/02* (2013.01);
(Continued)

(58) Field of Classification Search
CPC .......... B60T 1/10; B60T 1/087; B60T 13/586; B60T 13/588; B60L 50/61; F16D 57/04; F16D 61/00
(Continued)

(56) References Cited

U.S. PATENT DOCUMENTS 8,544,575 B1 * 10/2013 Scaringe ................ B60K 6/485
180/65.21
2011/0114405 A1 * 5/2011 Perhats ................ B60H 1/3222
180/68.1
(Continued)

FOREIGN PATENT DOCUMENTS

CN 207049235 U 2/2018
DE 3137197 A1 11/1983
(Continued)

OTHER PUBLICATIONS

Notice according to Article 94(3) EPO issued in European Patent Application No. 20804222.6 dated Mar. 1, 2024 with English translation through google translate.
(Continued)

Primary Examiner — Hau V Phan
(74) Attorney, Agent, or Firm — Weber Rosselli & Cannon LLP

(57) ABSTRACT

The present disclosure relates to a device for energy recovery for an electrically driven motor vehicle. The device includes an electric drive unit for driving the motor vehicle and a permanent brake deice which is designed as a hydrodynamic retarder and is or can be drivingly connected to the electric drive unit. A waste heat recovery device has an expansion machine which is or can be connected to the permanent brake device for energy recovery of a waste heat resulting from the braking of the permanent brake device.
(Continued)

The present disclosure also relates to a method for energy recovery in an electrically driven motor vehicle.

19 Claims, 4 Drawing Sheets

(51) Int. Cl.
*B60T 1/087* (2006.01)
*B60T 10/02* (2006.01)
*B60T 13/58* (2006.01)
*F16D 57/04* (2006.01)
*F16D 61/00* (2006.01)

(52) U.S. Cl.
CPC .......... *B60T 13/586* (2013.01); *B60T 13/588* (2013.01); *F16D 57/04* (2013.01); *F16D 61/00* (2013.01)

(58) Field of Classification Search
USPC ........................................................ 180/165
See application file for complete search history.

(56) References Cited

U.S. PATENT DOCUMENTS

| | | |
|---|---|---|
| 2016/0131009 A1 | 5/2016 | Etchason |
| 2018/0186228 A1* | 7/2018 | Wang .................... B60W 30/18 |
| 2018/0370324 A1* | 12/2018 | Zhou .................. B60H 1/00278 |
| 2019/0070924 A1* | 3/2019 | Mancini ............. B60H 1/32281 |
| 2019/0168576 A1* | 6/2019 | Larson ............... B60H 1/00885 |
| 2019/0271258 A1* | 9/2019 | Mendez Abrego ..... F01P 7/164 |
| 2019/0305558 A1* | 10/2019 | Abaitancei .......... F16H 61/4096 |

FOREIGN PATENT DOCUMENTS

| | | |
|---|---|---|
| DE | 102017010531 A1 | 5/2018 |
| DE | 102017202322 A1 | 8/2018 |
| DE | 102018103592 A1 | 9/2018 |
| EP | 3018306 A1 | 5/2016 |
| EP | 3023622 A1 | 5/2016 |
| WO | 2019147179 A1 | 8/2019 |

OTHER PUBLICATIONS

Preliminary Office Action issued in Brazilian Application No. BR112022009517-1 dated Apr. 15, 2024 with English translation.
German Search Report issued in German Patent Application No. 102019007992.2 dated Jul. 29, 2020. English translation not available.
International Search Report and Written Opinion issued in PCT/EP2020/081453 dated Feb. 4, 2021, with English translation.
Korean Office Action issued in Korean Patent Application No. 10-2022-7020099 dated Apr. 1, 2025 with English translation.

* cited by examiner

DEVICE AND METHOD FOR ENERGY RECOVERY FOR AN ELECTRICALLY DRIVEN MOTOR VEHICLE

CROSS-REFERENCE TO RELATED APPLICATIONS

This application is a U.S. National Stage Entry filed under 35 U.S.C. § 371 of International Application No. PCT/EP2020/081453, filed on Nov. 9, 2020, which claims the benefit of, and priority to, German Patent Application No. DE 10 2019 007 992.2, filed on Nov. 18, 2019, the entire content of each of which is incorporated by reference herein.

BACKGROUND

Technical Field

The present disclosure relates to a device for energy recovery for an electrically driven motor vehicle, preferably a commercial vehicle. The present disclosure also relates to a method for energy recovery in an electrically driven motor vehicle.

Background of Related Art

Unlike in conventional motor vehicles with an internal combustion engine, in electrically driven motor vehicles there is no engine brake power provided, capable of relieving the load on the service brake as permanent brake device and thus increasing the active safety. This is relevant in particular for heavy commercial vehicles.

Document DE 10 2018 1030592 A1 discloses a system for an electric drive with an additional brake system which has a hydraulic retarding device which is designed for mechanical connection to an end of a rotor of an electric motor. When activated, the hydraulic retarding device exerts a braking force onto the axial end of the rotor via the mechanical connection.

Document DE 10 2017 010 531 A1 discloses a WHR system for a vehicle which includes an internal combustion engine and a hydraulic retarder. The WHR system includes a WHR circuit with a pump and a first evaporator, in which a working medium is heated by exhaust gases from the internal combustion engine. In an expander, heat energy from the working medium is converted into mechanical energy. The WHR system includes a heat store, which stores heat energy from a braking process of the hydraulic retarder, and a second evaporator, in which a working medium is heated by heat energy from the heat store. A valve assembly conducts the flow of working medium in the WHR circuit to the first evaporator or to the second evaporator.

SUMMARY

An object of the present disclosure is to create an alternative and/or improved way of increasing the efficiency of an electrically driven motor vehicle.

The object of the present disclosure is achieved by the features of the independent claims. Advantageous developments are stated in the dependent claims and the description.

In accordance with one aspect, a device for energy recovery for an electrically driven motor vehicle, such as a commercial vehicle (for example heavy goods vehicle or bus) is disclosed. The device has an electric drive unit for driving the motor vehicle and a permanent brake device which is designed as a hydrodynamic retarder and is or can be drivingly connected to the electric drive unit. The device has a waste heat recovery device with an expansion machine (for example turbine, reciprocating engine or scroll expander), which is or can be connected to the permanent brake device for energy recovery from a waste heat resulting from the braking of the permanent brake device.

The device allows energy to be recovered from the waste heat resulting from braking. The efficiency of the electric drivetrain can thus be further increased, since less energy is lost in the form of waste heat. The range of the motor vehicle can thus likewise be increased.

In one embodiment, the waste heat recovery device can be based on a Clausius-Rankine cycle or on a Joule-Brayton cycle.

In an aspect of the present disclosure, a heat exchanger is integrated in the permanent brake device and is designed to transfer waste heat from the permanent brake device (for example from a fluid circuit of the permanent brake device) to a fluid circuit of the waste heat recovery device. The heat exchanger can thus be arranged directly in the permanent brake device in a space-saving manner. A particularly large amount of waste heat resulting from braking can thus also be transferred to the waste heat recovery device.

In aspects, a heat exchanger is arranged outside the permanent brake device, wherein the heat exchanger is designed to transfer waste heat from the permanent brake device (for example from a fluid circuit of the permanent brake device) to a fluid circuit of the waste heat recovery device. Such an arrangement can be realized relatively easily and therefore can be advantageous for example from cost viewpoints or for reasons related to installation space.

In a further development, the heat exchanger is an evaporator which is designed to evaporate a working fluid of the waste heat recovery device (for example to realize the Clausius-Rankine cycle). In embodiments, the heat exchanger can be designed for example as a liquid-gas heat exchanger, in which a gaseous working fluid of the waste heat recovery device can be heated (for example to produce the Joule-Brayton cycle).

In one embodiment, the waste heat recovery device has an expansion machine bypass, which bypasses the expansion machine. The waste heat recovery device can additionally have a valve device, which is arranged to adapt a fluid flow through the expansion machine and/or the expansion machine bypass. The controllability of the waste heat recovery device can thus be improved. For example, an overloading of the expansion machine can thus be prevented.

In a further development, the waste heat recovery device has a (for example isenthalpic) throttle, which is arranged in the expansion machine bypass. The throttle can be provided integrated with or separately from the valve device.

In a further embodiment, the waste heat recovery device has a control unit, which is designed to actuate the valve device, depending on an operating parameter (for example speed) of the expansion machine and/or a fluid parameter (for example temperature, pressure and/or mass flow) of a working fluid of the waste heat recovery device, which in embodiments, may be upstream and/or downstream of the expansion machine.

The term "control unit" can refer to an electronics unit (for example with microprocessor(s) and data store) and/or mechanical controller and/or hydraulic controller, which can perform open-loop control tasks and/or closed-loop control tasks depending on design. When the term "control" is used herein, this can thus expediently also include "closed-loop control" or "control with feedback".

In an embodiment, the waste heat recovery device has a cooler, such as a fan-cooled cooler, which in embodiments may be a condenser or a gas cooler, which is arranged downstream of the expansion machine. The fan can be driven for example electrically and/or can be controlled by means of the control unit, depending on at least one fluid parameter of the working fluid of the waste heat recovery device, for example upstream or downstream of the cooler.

In a further development, the waste heat recovery device has an intermediate heat exchanger (for example preheater), which is arranged for thermal coupling of a fluid line (for example directly) upstream of the cooler to a fluid line (for example directly) downstream of the cooler. In embodiments, the waste heat recovery device can also have a valve device, which is arranged to adapt a fluid flow through the cooler and/or the intermediate heat exchanger. A recovery can thus be made possible when the fluid parameters of the working fluid downstream of the expansion machine are still higher than the ambient level.

In embodiments, the waste heat recovery device has a cooler bypass which bypasses the cooler. In embodiments, the waste heat recovery device can have a valve device, which is arranged to adapt a fluid flow through the cooler and/or the cooler bypass. In embodiments, a throttle can be arranged in the cooler bypass. A recovery can thus likewise be made possible when the fluid parameters of the working fluid downstream of the expansion machine are still higher than ambient level.

In an embodiment, the waste heat recovery device has a heat exchanger, such as an evaporator or a preheater, of a heat pump (for example of a vehicle air-conditioning system) of the device, wherein the heat exchanger is arranged for thermal coupling to a fluid line (for example directly) upstream of the cooler. For example, a valve device can be arranged to adapt a fluid flow through the cooler and/or the heat exchanger. A recovery can thus likewise be made possible when the fluid parameters of the working fluid downstream of the expansion machine are still higher than ambient level.

In a further development, the waste heat recovery device has a control unit, which is designed to actuate the valve device depending on a fluid parameter (for example temperature, pressure and/or mass flow) of a working fluid of the waste heat recovery device, (for example directly) upstream and/or (for example directly) downstream of the cooler.

In one embodiment, the electric drive unit is embodied as an electric central drive unit. The permanent brake device can be directly connected drivingly to the electric central drive unit, to a transmission of the device or to a wheel of the device.

In another embodiment, the electric drive unit is may be an electric direct wheel drive (for example wheel hub motor). The permanent brake device can be directly connected drivingly to the direct wheel drive or a wheel of the device.

In another embodiment, the electric drive unit may be an electric single-wheel drive positioned close to the wheel. The permanent brake device can be directly connected drivingly to the electric single-wheel drive positioned close to the wheel, to a transmission, such as a planetary transmission, of the device or to a wheel of the device.

In one embodiment, the waste heat recovery device contains water, a water-glycol mixture, an organic fluid, an inorganic fluid and/or an alcohol as working fluid.

In a further embodiment, the waste heat recovery device is designed to electrically and/or mechanically store energy recovered by means of the expansion machine (for example in a flywheel accumulator or battery) and/or to feed such energy (for example directly or indirectly) into an on-board power system of the motor vehicle.

In an embodiment, the waste heat recovery device can be operated with or without a phase transition of the working fluid.

In embodiments, the waste heat recovery unit has a conveying device, such as a pump or a compressor. The conveying device can be arranged upstream of the expansion machine, wherein for example the conveying device can be coupled drivingly to the expansion machine.

In one embodiment, the waste heat recovery device is connected to an internal combustion engine for energy recovery from waste heat, for example from a coolant and/or a waste gas of the internal combustion engine (for example by means of a further heat exchanger). Alternatively or additionally, the waste heat recovery device can be connected to an energy supply device (for example battery, current converter (in particular DC-DC converter), current distributor and/or power electronics), which supplies the electric drive unit with electrical energy, for energy recovery from waste heat of the energy supply device (for example by means of a further heat exchanger). Alternatively or additionally, the waste heat recovery device can be connected (for example by means of a further heat exchanger) to the electric drive unit for energy recovery from waste heat of the electric drive unit.

In accordance with a further aspect, a motor vehicle (for example a fully electric motor vehicle or hybrid motor vehicle), such as a commercial vehicle (for example heavy goods vehicle or bus), is disclosed. The motor vehicle has a device as disclosed herein.

In accordance with a further aspect, a method for energy recovery in an electrically driven motor vehicle, as disclosed herein, is disclosed. The motor vehicle has a permanent brake device formed as a hydrodynamic retarder and a waste heat recovery device with an expansion machine. The method includes a braking of the motor vehicle by means of the permanent brake device and a driving of the expansion machine by means of waste heat from the permanent brake device.

In an embodiment, the method may include an evaporation or heating of a (for example liquid or gaseous) working fluid in or outside the permanent brake device by means of the waste heat of the permanent brake device and feeding of the working fluid to the expansion machine.

In another embodiment, the method includes a bypassing of the expansion machine by means of a bypass when an operating parameter (for example speed) of the expansion machine and/or a fluid parameter (for example pressure, temperature and/or mass flow) of a working fluid exceeds a predetermined value, and in embodiments, also with throttling of the working fluid as the expansion machine is bypassed.

In embodiments, the method includes a storing of electrical and/or mechanical energy which has been recovered from the driving of the expansion machine.

In an embodiment, the method includes a recovery of heat energy from a working fluid flow downstream of the expansion machine.

The previously described embodiments and features of the present disclosure can be combined arbitrarily with one another.

BRIEF DESCRIPTION OF THE DRAWINGS

Further details and advantages of the present disclosure will be described hereinafter with reference to the accompanying drawings, in which.

DETAILED DESCRIPTION

The embodiments shown in the figures are consistent at least in part, so that similar or identical parts are provided with the same reference signs and, with regard to their explanation, reference is also made to the description of the other embodiments and figures, in order to avoid repetition.

FIGS. 1-7 show electric drivetrains 10, which are each connected to a waste heat recovery device 12. The electric drivetrains 10 can be operably coupled to a motor vehicle in order to drive the motor vehicle. The motor vehicle can be embodied as a commercial vehicle, for example a heavy goods vehicle or a bus.

Figure 1:
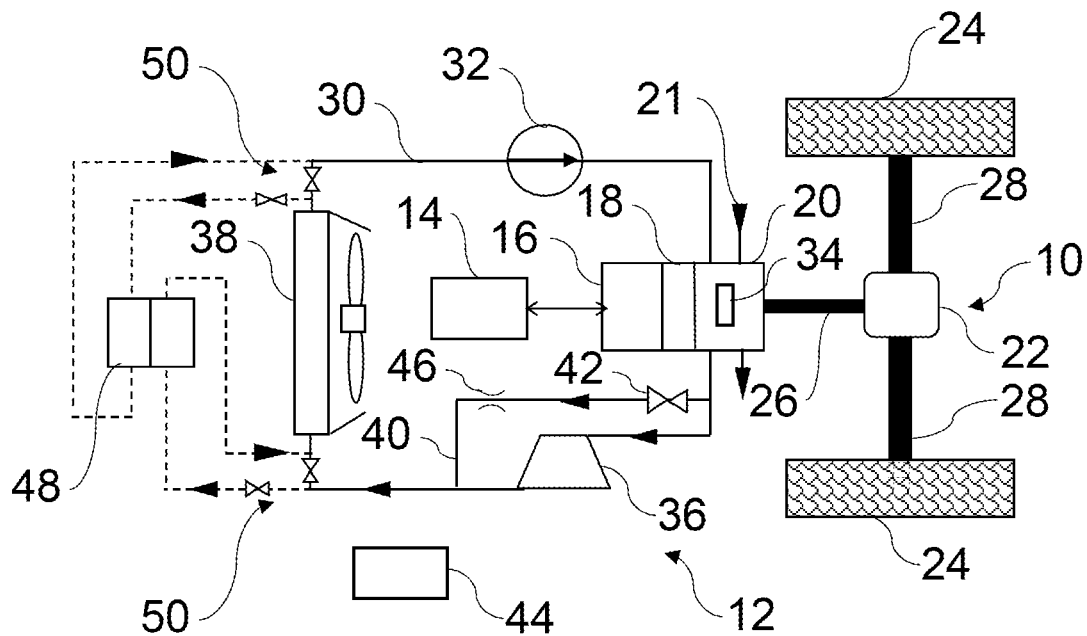
FIG. 1 is a schematic view of an electric drivetrain provided in accordance with the present disclosure.

FIG. 1 shows an electric drivetrain 10. The electric drivetrain 10 for example has an energy supply device 14, an electric drive unit 16, a transmission 18, a permanent brake device 20, a differential 22, and wheels 24.

The energy supply device 14 can include all components that are necessary to supply electrical energy to the electric drive unit 16. For example, the energy supply unit 14 can include a charging device, an electric energy store, a current converter (for example DC-DC converter), a current distributor, power electronics and/or a fuel cell device.

The electric drive unit 16 is supplied with electric current by the energy supply device 14. The electric drive unit 16 is embodied as an electric central drive unit. The electric drive unit 16 can be arranged as a longitudinal motor. The electric unit 16 is drivingly connected to the transmission 18 and the permanent brake device 20.

It is possible that the electric drivetrain 10 is part of a hybrid drivetrain, which may include an internal combustion engine to drive the motor vehicle.

The transmission 18 can be optional, for example depending on the embodiment of the electric drive unit 16. The transmission 18 can be embodied for example as a reduction gearing and/or an automatic transmission.

The permanent brake device 20 is embodied as a hydrodynamic retarder or a hydrodynamic retarding brake. The permanent brake device 20 can have a fluid circuit 31 (only shown in part). The working fluid, for example, oil, water or a water-glycol mixture, can circulate in the fluid circuit 21 when the permanent brake device 20 is activated. It is possible that a pump and optionally a cooler is integrated in the fluid circuit 21.

The permanent brake device 20 can also include, for example, a rotor, which is or can be drivingly connected to the electric drivetrain 10, and a fixed stator. The permanent brake device 20 can be activated to brake the motor vehicle as a result of the working fluid being conducted by means of the fluid circuit 21 to the permanent brake device 20. Friction of the working fluid as it flows through the permanent brake device 20 converts kinetic energy of the rotor into heat. The temperature and enthalpy of the working fluid is increased. The electric drivetrain 10 is braked. The permanent brake device 20 can utilize the principle of rising viscosity with rising temperature caused by the resultant friction. The braking effect of the permanent brake device 20 may be dependent on the vehicle speed.

The permanent brake device 20 is integrated at any suitable position in the electric drivetrain 10 in order to bring about a braking power. The permanent brake device 20 can be drivingly coupled to the electric drive unit 16 directly or indirectly, depending on the used drive concept. The permanent brake device 20 can be integrated for example at least in part in the transmission 18 or is or can be directly connected drivingly to the transmission 18.

In the embodiment shown in FIG. 1, the permanent brake device 20 is arranged drivingly between the transmission 18 and the differential 22. A shaft 26 can connect the permanent brake device 20 drivingly to the differential 22. The shaft 26 can be embodied as a joint shaft. It is possible that the permanent brake device 20 is integrated for example at least in part in the electric drive unit 16, the differential 22 or the wheels 24, or is directly connected drivingly thereto. It is also possible that the permanent brake device 20 is interconnected or connected in parallel in the electric drivetrain 10.

The differential 22 drives the wheels 24 by means of axle shafts 28.

The waste heat recovery device 12 is designed to recover usable energy (for example electrical energy or mechanical energy) from waste heat resulting from the braking of the hydrodynamic permanent brake device 20.

In the embodiment of FIG. 1, the waste heat recovery device 12 realizes a Clausius-Rankine cycle. The working fluid of the waste heat recovery device 12 is subjected to a phase transition as it circulates.

The waste heat recovery device 12 includes a fluid circuit 30 with a conveying device 32, a heat exchanger 34, an expansion machine 36 and a cooler 38. The conveying device 32 is arranged downstream of the cooler 38. The heat exchanger 34 is arranged downstream of the conveying device 32. The expansion machine 36 is arranged downstream of the heat exchanger 34. The cooler 38 is arranged downstream of the expansion machine 36.

The conveying device 32 conveys a working fluid circulating in the fluid circuit 30. The working fluid can be or can include, for example, water, a water-glycol mixture, an organic fluid, an inorganic fluid or an alcohol. The conveying device 32 conveys the working fluid from the cooler 38 to the heat exchanger 34. In the embodiment of FIG. 1, the conveying device 32 is embodied as a pump for conveying the working fluid in the liquid state of aggregation.

The heat exchanger 34 is integrated in the permanent brake device 20. The heat exchanger 34 transfers the waste heat of the working fluid of the fluid circuit 21 in the permanent brake device 20, said waste heat being created under braking, to the working fluid of the fluid circuit 30 of the waste heat recovery device 12. In the embodiment of FIG. 1 the heat exchanger 34 is embodied as an evaporator integrated in the permanent brake device 20. The evaporator utilizes the waste heat of the working fluid of the fluid circuit 21 to heat and evaporate the working fluid of the fluid circuit 30 of the waste heat recovery device 12. The enthalpy of the working fluid of the waste heat recovery device 12 is increased. The working fluid of the waste heat recovery device 12 leaves the permanent brake device 20 in the gaseous state, for example in the form of wet steam or superheated steam.

In the expansion machine 36, the intrinsic energy of the working fluid is reduced by expanding the working fluid and in so doing is converted in part into mechanical energy. For example, an output element, such as an output shaft, of the expansion machine 36 can thus be driven. The expansion machine 36 can be embodied for example as a turbine (as shown in FIG. 1), a reciprocating engine or a scroll expander.

The output elements of the expansion machine 36 can be connected drivingly for example to a mechanical energy store, for example a mechanical flywheel accumulator, in order to temporarily store the recovered mechanical energy. At a later point in time, this mechanical energy can be coupled for example into the electric drivetrain 10 and can be used to drive the motor vehicle. The coupling can be provided for example in the region of the electric drive unit 16, the transmission 18, the shaft 26, the differential 22, the axle shaft 28 and/or the wheels 24. It is also possible that the output element of the expansion machine 36 is connected drivingly to the conveying device 32.

The output elements of the expansion machine 36 can also be drivingly connected for example to a generator in order to recover electrical energy from the recovered mechanical energy. The electrical energy can be temporarily stored for example in a battery (for example of the energy supply device 14) and/or can be fed directly into an electrical on-board power system of the motor vehicle.

The working fluid is cooled in the cooler 38. The cooler 38 can be cooled by means of a electrically driven fan. In the embodiment of FIG. 1, the cooler 38 is embodied as a condenser. The condenser condenses the working fluid fully, so that the conveying device 32 can suck the liquid working fluid in again.

It is possible that the waste heat recovery device 12 has a bypass 40. The bypass 40 bypasses the expansion machine 36. The bypass 40 branches off from a fluid line of the fluid circuit 30 connecting the heat exchanger 34 to the expansion machine 36. The bypass 40 opens out into a fluid line of the fluid circuit 30 connecting the expansion machine 36 to the cooler 38.

In order to adapt a fluid flow through the bypass 40 and the expansion machine 30, a valve device 42 is provided. The valve device 42 can include one or more valves. The valve device 42 can be arranged in the bypass 40, at the branching of the bypass from the fluid line upstream of the expansion machine 36 and/or in the fluid line upstream of the expansion machine 36.

The bypass 40 can have the purpose of diverting working fluid, when necessary, so as not to exceed a maximum pressure before or in the expansion machine 36. A control unit 44 can be provided to control the valve device 42. The control unit 44 can actuate the valve device 42 depending on at least one fluid parameter (for example temperature, pressure and/or mass flow) of the working fluid of the waste heat recovery device 12. The at least one fluid parameter can be measured or estimated. The at least one fluid parameter can expediently relate to a state of the working fluid downstream of the heat exchanger 34, upstream of the expansion machine 36 and/or downstream of the expansion machine 36. Alternatively or additionally, the control unit 44 can actuate the valve device for example depending on an operating parameter (for example speed) of the expansion machine 36.

For example, if a current value of a fluid parameter or of an operating parameter exceeds a predetermined value (for example fluid pressure or speed), the control unit 44 can actuate the valve device 42 to at least partly divert the working fluid through the bypass 40. For example, if a current value of a fluid parameter or of an operating parameter drops below a predetermined value (for example fluid pressure or speed), the control unit 44 can actuate the valve device 42 to at least partly close the fluid connection through the bypass 40.

It is possible that a throttle 46 is arranged in the bypass 40. The throttle 46 can throttle the working fluid, which for example is isenthalpic, flowing through the bypass 40. The throttle 46 can be provided separately to the valve device 42 or can be integrated in a valve of the valve device 42.

The waste heat recovery device 12 can optionally also include an intermediate heat exchanger 48 and a valve device 50.

The intermediate heat exchanger 48 can couple working fluid from upstream of the cooler 38 thermally to fluid downstream of the cooler 38. The working fluid downstream of the cooler 38 can thus be pre-heated. The intermediate heat exchanger 48 can transfer heat from the working fluid of a fluid line upstream of the cooler 38, which for example is arranged as a bypass upstream of the cooler 38, to the working fluid in a fluid line downstream of the cooler 38, which for example is arranged as a bypass downstream of the cooler 38. The intermediate heat exchanger 48 can be embodied as a liquid-liquid heat exchanger.

The valve device 50 is arranged to adapt the fluid flow to the cooler 38 and the intermediate heat exchanger 48. For this purpose, the valve device 50 can be arranged arbitrarily and for example can have a plurality of valves. The valve device 50 for example can also include check valves.

The control unit 44 can actuate the valve device 50 depending on at least one current fluid parameter of the working fluid (for example temperature) upstream and/or downstream of the cooler 38. The fluid parameter can be measured or estimated.

The intermediate heat exchanger 48 can be used if a fluid parameter of the working fluid downstream of the expansion machine 36 and upstream of the cooler 38 still lies above an ambient level, in order to allow a further recovery.

Figure 2:
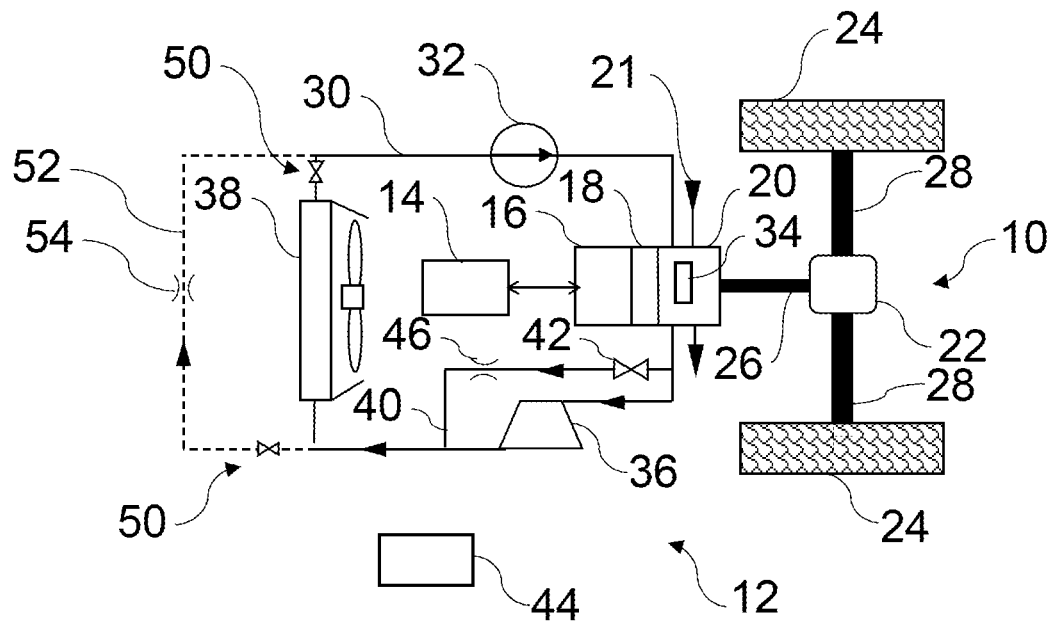
FIG. 2 is a schematic view of an alternate embodiment of the electric drivetrain of FIG. 1 provided in accordance with the present disclosure.

FIG. 2 shows an embodiment modified in comparison to FIG. 1. In FIG. 2 a bypass 52 is provided instead of the intermediate heat exchanger 48 from FIG. 1.

The bypass 52 bypasses the cooler 38. A throttle 54 can be arranged in the bypass 52. The throttle 54 leads to full condensation of the working fluid. The control unit 44 can actuate the valve device 50, again depending on at least one current fluid parameter of the working fluid (for example temperature) upstream and/or downstream of the cooler 38, in order to allow a flow through the bypass 52 at least in part or not at all.

Figure 3:
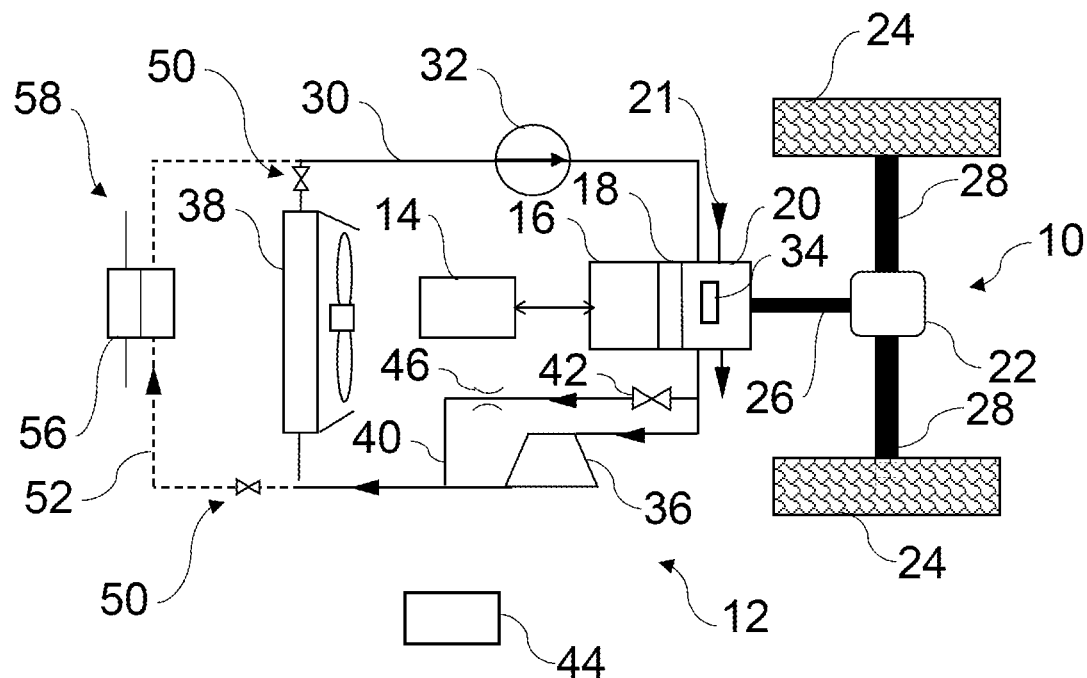
FIG. 3 is a schematic view of an alternate embodiment of the electric drive train of FIG. 2 provided in accordance with the present disclosure.

FIG. 3 shows an embodiment modified in comparison to FIG. 2. In FIG. 3, a heat exchanger 56 is arranged in the bypass 52. The heat exchanger 56 can be part of a heat pump 58 (only shown in part). The heat exchanger 56 can be embodied for example as an evaporator or a preheater of the heat pump 58. For example, a climatization of the motor vehicle can be implemented by means of the heat pump 58.

It is also possible that the heat exchanger 56 is arranged for example in a fluid line, which for example is arranged as a bypass upstream of the cooler 38 (see for example FIG. 1).

The embodiments shown in FIGS. 1 to 3 thus allow a recovery of heat energy from a working fluid flow downstream of the expansion machine 36.

Figure 4:
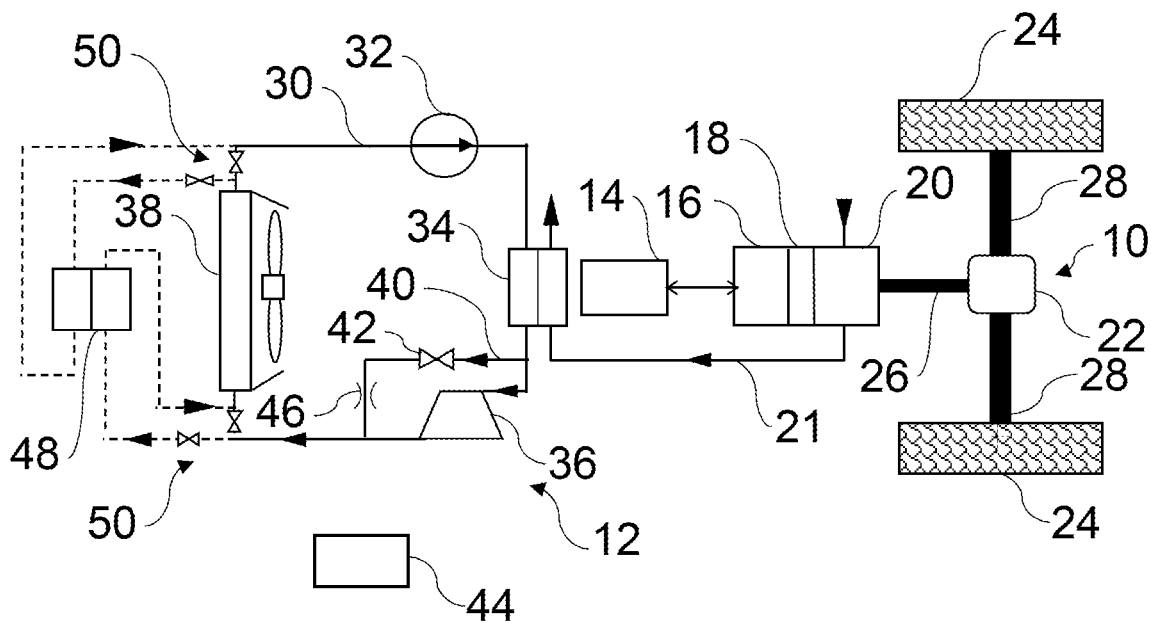
FIG. 4 is a schematic view of an alternate embodiment of the electric drive train of FIG. 1 provided in accordance with the present disclosure.

FIG. 4 shows an embodiment modified in comparison to FIG. 1. In FIG. 1, the fluid circuit 30 is embodied as a primary circuit, which is guided through the permanent brake device 20. In FIG. 4 the fluid circuit 30 is embodied as a secondary circuit, which is arranged separately to the permanent brake device 20. The heat exchanger 34 embodied as an evaporator and located between the fluid circuit 21 and the fluid circuit 30 is arranged outside the permanent brake device 20.

Figure 5:
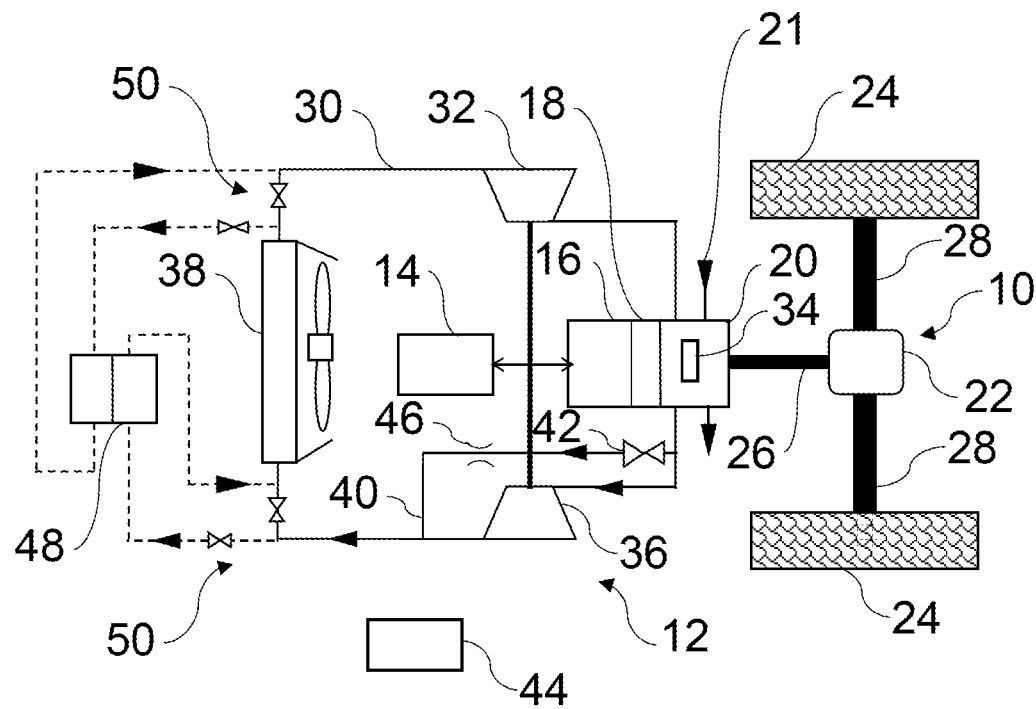
FIG. 5 is a schematic view of an alternate embodiment of the electric drive train of FIG. 1 provide in accordance with the present disclosure.

FIG. 5 shows an embodiment modified in comparison to FIG. 1. In FIG. 1, the waste heat recovery device 12 realizes a Clausius-Rankine cycle (counter-clockwise cycle). In FIG. 5, the waste heat recovery device 12 by contrast realizes a Joule-Brayton cycle (clockwise cycle).

The conveying device 32 is embodied as a compressor. The expansion machine 36 can drive the conveying device 32 directly. The heat exchanger 32 is to this end designed to transfer the waste heat of the liquid working fluid of the permanent brake circuit 20 to the gaseous working fluid of the fluid circuit 30 (liquid-gas heat exchanger). There is no phase transition of the working fluid. The heat exchanger 34 can be integrated in the permanent brake device 20, as shown in FIG. 5. Similarly to FIG. 4, it is also possible for example that the heat exchanger 34 is arranged externally of the permanent brake device 20. The cooler 30 is embodied as a gas cooler. The optional intermediate heat exchanger 48 can be embodied as a gas-to-gas heat exchanger. The working fluid is gaseous in the entire fluid circuit 30.

Figure 6:
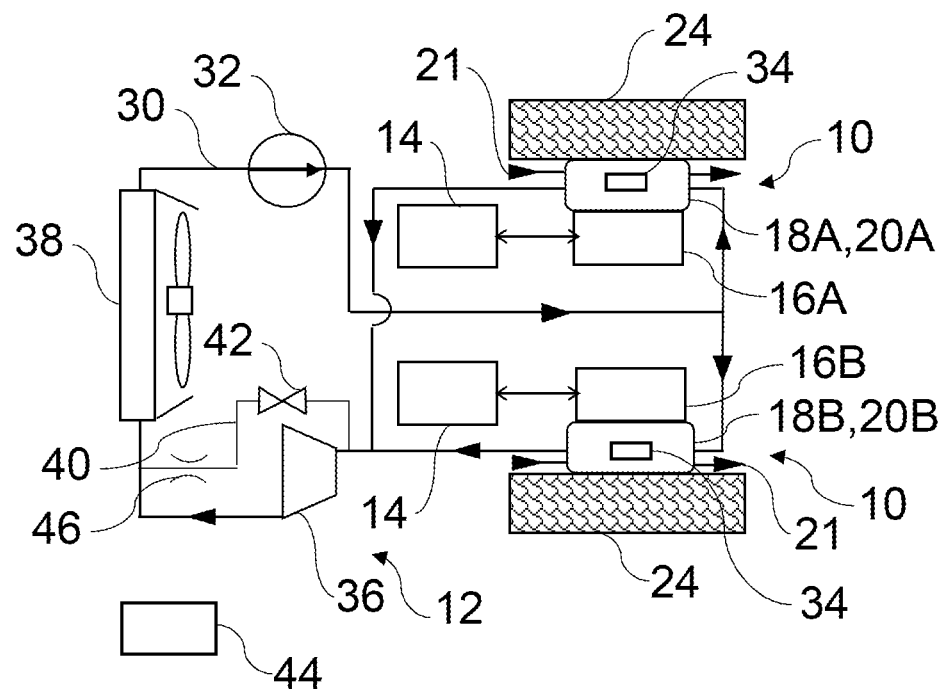
FIG. 6 is a schematic view of an alternate embodiment of the electric drive train of FIG. 1 provided in accordance with the present disclosure.

FIG. 6 shows an embodiment modified in comparison to FIG. 1. A first drive unit 16A and a second drive unit 16B are in each case arranged as drive units positioned close to the wheel. The drive units 16A, 16B in each case drive the corresponding wheel 24 directly via the corresponding transmission 18A, 18B. The transmissions 18A, 18B are embodied as planetary gearings. Two permanent brake devices 20A, 20B are provided in each case with their own heat exchanger 34. The permanent brake devices 20A, 20B can be connected for example directly drivingly to the corresponding drive unit 16A or 16B, to the corresponding transmission 18A or 18B or to the corresponding wheel hub of one of the wheels 24, or can be integrated therein.

Figure 7:
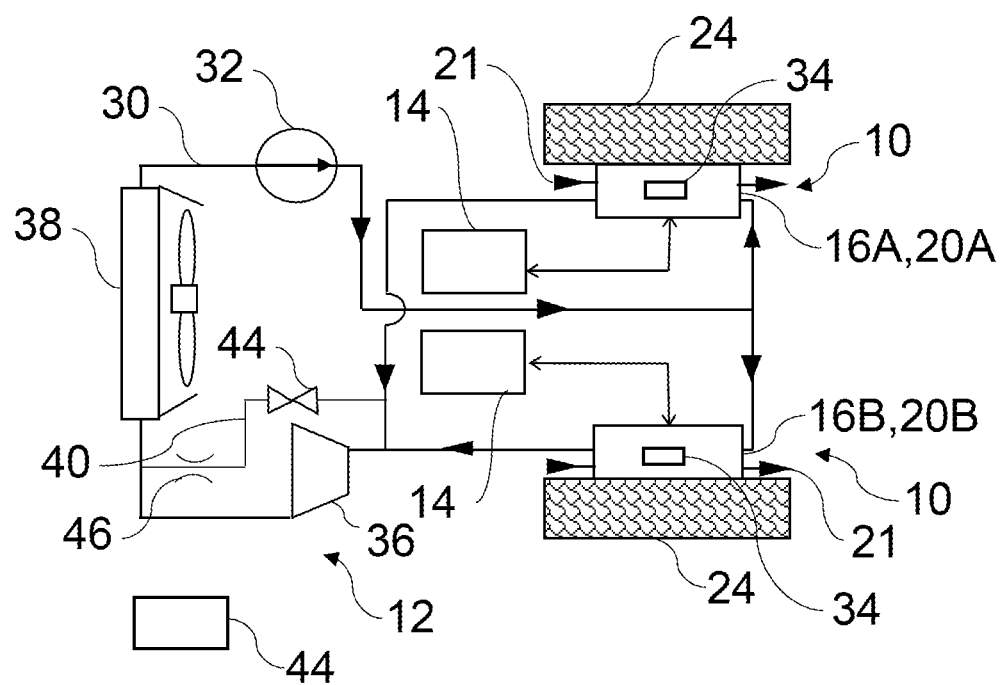
FIG. 7 is a schematic view of an alternate embodiment of the electric drive train of FIG. 6 provided in accordance with the present disclosure.

FIG. 7 shows an embodiment modified in comparison to FIG. 6. There is no (reduction) gearing between the drive units 16A, 16B and the wheels 24. The drive units 16A, 16B drive the wheels directly, for example in the form of wheel hub drive units. The permanent brake devices 20A, 20B can be connected for example directly drivingly to the corresponding drive unit 16A or 16B or the corresponding wheel hub of one of the wheels 24, or can be integrated therein.

The individual features of the embodiments shown in FIGS. 1 to 7 can be combined arbitrarily with one another, provided this does not result in any technical conflicts. For example, the embodiments of FIGS. 4 and 5, alternatively to the intermediate heat exchanger 48, can include for example the bypass 52 (see FIGS. 2 and 3), for example with the heat exchanger 56. For example, the embodiments in FIGS. 6 and 7, alternatively to the Clausius-Rankine waste heat recovery device 12, can include a Joule-Brayton waste heat recovery device 21 (see for example FIG. 5). For example, the embodiments of FIGS. 6 and 7 can include the heat exchangers 34 also externally of the permanent brake devices 20A, 20B (see for example FIG. 4). For example, the embodiments of FIGS. 6 and 7 can additionally include the intermediate heat exchanger 48, the valve device 50, the bypass 52, the throttle 54 and/or the heat exchanger 56.

It is also possible that the waste heat recovery device 12 (for example one of FIGS. 1 to 7) draws additional waste heat from a system other than the permanent brake device 20, for example by means of an additional heat exchanger, which is arranged in a fluid circuit 30, for thermal coupling. For example, the waste heat recovery device 12 can be thermally coupled to a cooling circuit or an exhaust gas system of an internal combustion engine if the electric drivetrain 10 is designed as part of a hybrid drivetrain. The waste heat recovery device 12 can also be thermally coupled to a cooling circuit of the energy supply device 14 (for example battery, current converter (in particular DC-DC converter), current distributor, power electronics. The waste heat recovery device 12 can also be thermally coupled to a cooling circuit of the electric drive unit 16 for energy recovery from waste heat of the electric drive unit 16.

The present disclosure is not limited to the embodiments described above. Rather, a variety of variants and modifications are possible which also make use of the present disclosure and therefore fall within the scope of protection. In particular, the present disclosure also claims protection for the subject matter and features of the dependent claims, regardless of the referenced claims. In particular, the individual features of independent claim 1 are disclosed in each case independently of one another. In addition, the features in the dependent claims are also disclosed independently of all features of independent claim 1 and for example independently of the features relating to the presence and/or the configuration of the electric drive unit, the permanent brake device and/or the waste heat recovery device of independent claim 1.

LIST OF REFERENCE SIGNS 10 electric drivetrain
12 waste heat recovery device
14 energy supply device
16 electric drive unit
16A first electric drive unit
16B second electric drive unit
18 transmission
18A first transmission
18B second transmission
20 permanent brake device
20A first permanent brake device
20B second permanent brake device
21 fluid circuit
22 differential
24 wheel
26 shaft
28 axle shaft
30 fluid circuit
32 conveying device
34 heat exchanger
36 expansion machine
38 cooler
40 bypass
42 valve device
44 control unit
46 throttle
48 intermediate heat exchanger/preheater
50 valve device
52 bypass
54 throttle
56 heat exchanger
58 heat pump

What is claimed is:

1. A device for energy recovery for an electrically driven motor vehicle, the device comprising:
an electric drive unit for driving the motor vehicle;
a permanent brake device, which is designed as a hydrodynamic retarder and is or can be drivingly connected to the electric drive unit; and
a waste heat recovery device with an expansion machine, which can be connected to the permanent brake device for energy recovery from a waste heat resulting from the braking of the permanent brake device.

2. The device as claimed in claim 1, wherein:
the waste heat recovery device is based on a Clausius-Rankine cycle; or
the waste heat recovery device is based on a Joule-Brayton cycle.

3. The device as claimed in claim 1, wherein:
a heat exchanger is integrated in the permanent brake device and is designed to transfer waste heat from the permanent brake device to a fluid circuit of the waste heat recovery device; or
a heat exchanger is arranged outside the permanent brake device, wherein the heat exchanger is designed to transfer waste heat from the permanent brake device to a fluid circuit of the waste heat recovery device.

4. The device as claimed in claim 3, wherein:
the heat exchanger is an evaporator which is designed to evaporate a working fluid of the waste heat recovery device; or
the heat exchanger is designed as a liquid-gas heat exchanger, in which a gaseous working fluid of the waste heat recovery device can be heated.

5. The device as claimed in claim 1, wherein:
the waste heat recovery device includes an expansion machine bypass, which bypasses the expansion machine, and a valve device, which is arranged to adapt a fluid flow through the expansion machine or the expansion machine bypass.

6. The device as claimed in claim 5, wherein:
the waste heat recovery device includes a throttle, which is arranged in the expansion machine bypass and is integrated with the valve device; or
the waste heat recovery device comprises a control unit, which is designed to actuate the valve device depending on an operating parameter of the expansion machine or a fluid parameter of a working fluid of the waste heat recovery device; or
the waste heat recovery device includes a throttle, which is arranged in the expansion machine bypass and is separate from the valve device.

7. The device as claimed in claim 1, wherein:
the waste heat recovery device includes a cooler (38) which is arranged downstream of the expansion machine.

8. The device as claimed in claim 7, wherein:
the cooler is a fan cooled cooler; or
the cooler is a condenser; or
the cooler is a gas cooler.

9. The device as claimed in claim 7, wherein:
the waste heat recovery device includes an intermediate heat exchanger, which is arranged for thermal coupling of a fluid line upstream of the cooler to a fluid line downstream of the cooler, and a valve device, which is arranged to adapt a fluid flow through the cooler or the intermediate heat exchanger; or
the waste heat recovery device includes a cooler bypass, which bypasses the cooler, and a valve device, which is arranged to adapt a fluid flow through the cooler or the cooler bypass; or
the waste heat recovery device includes a heat exchanger, a heat pump of the device, which is arranged for thermal coupling to a fluid line upstream of the cooler, and a valve device, which is arranged to adapt a fluid flow through the cooler or the heat exchanger.

10. The device as claimed in claim 9, wherein:
the heat exchanger is an evaporator; or
the heat exchanger is a preheater.

11. The device as claimed in claim 9, wherein:
the waste heat recovery device includes a control unit, which is designed to actuate the valve device depending on a fluid parameter of a working fluid of the waste heat recovery device.

12. The device as claimed in claim 11, wherein:
the fluid parameter of the working fluid of the waste heat recover device is upstream of the cooler; or
the fluid parameter of the working fluid of the waste heat recovery device is downstream of the cooler; or
the fluid parameter of the working fluid of the waste heat recovery device is downstream and upstream of the cooler.

13. The device as claimed in claim 1, wherein:
the electric drive unit is an electric central drive unit, and the permanent brake device is directly drivingly connected to the electrical central drive unit, a transmission of the device or a wheel of the device; or
the electric drive unit is an electric direct wheel drive, and the permanent brake device is directly connected drivingly to the direct wheel drive or a wheel of the device; or
the electric drive unit is an electric single-wheel drive positioned close to the wheel, and the permanent brake device is directly connected drivingly to the electric single-wheel drive positioned close to the wheel, to a transmission of the device or to a wheel of the device.

14. The device as claimed in claim 1, wherein:
the waste heat recovery device includes water, a water-glycol mixture, an organic fluid, an inorganic fluid or an alcohol as working fluid; or
the waste heat recovery device is designed to electrically or mechanically store energy recovered by means of the expansion machine or to feed said energy into an on-board power supply of the motor vehicle; or
the waste heat recovery device can be operated with or without a phase transition of the working fluid; or
the waste heat recovery device includes a conveying device which is arranged upstream of the expansion machine, wherein the conveying device is coupled drivingly to the expansion machine.

15. The device as claimed in claim 1, wherein:
the waste heat recovery device is connected to an internal combustion engine for energy recovery from waste heat from a coolant or an exhaust gas of the internal combustion engine; or
the waste heat recovery device is connected to an energy supply device, which supplies the electric drive unit with electrical energy, for energy recovery from waste heat of the energy supply device; or
the waste heat recovery device is connected to the electric drive unit for energy recovery from waste heat of the electric drive unit.

16. A motor vehicle, comprising:
a device for energy recovery for an electrically driven motor vehicle, the device including:
  an electric drive unit for driving the motor vehicle;
  a permanent brake device, which is designed as a hydrodynamic retarder and is or can be drivingly connected to the electric drive unit; and
  a waste heat recovery device with an expansion machine, which can be connected to the permanent brake device for energy recovery from a waste heat resulting from the braking of the permanent brake device.

17. The motor vehicle as claimed in claim 16, wherein the motor vehicle is a commercial vehicle.

18. A method for energy recovery in an electrically driven motor vehicle, comprising:
providing a device for energy recovery for an electrically driven motor vehicle, the device including:
  an electric drive unit for driving the motor vehicle;
  a permanent brake device, which is designed as a hydrodynamic retarder and is or can be drivingly connected to the electric drive unit; and
  a waste heat recovery device with an expansion machine, which can be connected to the permanent brake device for energy recovery from a waste heat resulting from the braking of the permanent brake device;
braking the motor vehicle by means of a permanent brake device, the permanent brake device designed as a hydrodynamic retarder and a waste heat recovery device having an expansion machine; and
driving the expansion machine by means of waste heat of the permanent braking device.

19. The method as claimed in claim 18, further comprising:
evaporating or heating a working fluid in or outside the permanent brake device by means of the waste heat of the permanent brake device and feeding the working fluid to the expansion machine; or
bypassing the expansion machine by means of a bypass if an operating parameter of the expansion machine or a fluid parameter of a working fluid exceeds a predetermined value; or
storing electrical or mechanical energy obtained from the driving of the expansion machine; or
recovering thermal energy from a working fluid flow downstream of the expansion machine.

* * * * *